US012078950B2

(12) United States Patent
Uno et al.

(10) Patent No.: US 12,078,950 B2
(45) Date of Patent: Sep. 3, 2024

(54) IMAGE FORMING APPARATUS

(71) Applicant: KYOCERA Document Solutions Inc., Osaka (JP)

(72) Inventors: Koji Uno, Osaka (JP); Keisuke Oba, Osaka (JP); Yasuhiro Michishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/336,835

(22) Filed: Jun. 16, 2023

(65) Prior Publication Data

US 2023/0418205 A1 Dec. 28, 2023

(30) Foreign Application Priority Data

Jun. 23, 2022 (JP) ................................ 2022-100919

(51) Int. Cl.

*G03G 15/00* (2006.01)
*G03G 15/01* (2006.01)
*G03G 15/08* (2006.01)
*G03G 15/16* (2006.01)

(52) U.S. Cl.

CPC ......... *G03G 15/80* (2013.01); *G03G 15/0131* (2013.01); *G03G 15/0806* (2013.01); *G03G 15/162* (2013.01); *G03G 15/5004* (2013.01); *G03G 2215/00632* (2013.01)

(58) Field of Classification Search

USPC .......................................................... 399/90
See application file for complete search history.

(56) References Cited

U.S. PATENT DOCUMENTS

2017/0192376 A1 7/2017 Taira ................. G03G 15/1665
2018/0217530 A1 * 8/2018 Kurokawa ............... H04N 1/29

FOREIGN PATENT DOCUMENTS

JP 2014-178707 A 9/2014
JP 2017-122750 A 7/2017

* cited by examiner

*Primary Examiner* — Quana Grainger
(74) *Attorney, Agent, or Firm* — Stein IP, LLC

(57) ABSTRACT

An image forming apparatus includes an image carrying member, an intermediate transfer belt, a primary transfer roller, a first belt support roller, a secondary transfer roller, a second belt support roller, a current feeder, a controller, a current sensor, and a rectifier. The current sensor has a lead member. The rectifier shuts off a current passing from the second belt support roller to the ground if the voltage on the second belt support roller is less than a predetermined reference voltage. The controller controls the output current such that the secondary transfer current has a current value resulting from subtracting a leak current from the output current and, when the lead member is in a conducting state, keeps the voltage on the second belt support roller less than the reference voltage.

7 Claims, 3 Drawing Sheets

IMAGE FORMING APPARATUS

INCORPORATION BY REFERENCE

This application is based on and claims the benefit of priority from Japanese Patent Application No. 2022-100919 filed on Jun. 23, 2022, the contents of which are hereby incorporated by reference.

BACKGROUND

The present disclosure relates to an image forming apparatus.

Some known image forming apparatuses employ intermediate transfer as a method of transferring a toner image to a sheet. Such an image forming apparatus includes an image carrying member, an intermediate transfer belt, a primary transfer roller, a first belt support roller, a secondary transfer roller, a second belt support roller, and a current feeder.

The image carrying member carries a toner image on its surface. The intermediate transfer belt is a rotatably supported endless belt, and is disposed adjacent to the image carrying member. The primary transfer roller makes contact with the inner circumferential surface of the intermediate transfer belt, and is disposed opposite the image carrying member across the intermediate transfer belt. Applying a primary transfer voltage with the opposite polarity to toner permits the toner image carried on the image carrying member to be primarily transferred to the intermediate transfer belt.

The first belt support roller is rotatably supported at a position downstream of the primary transfer roller with respect to the rotation direction of the belt. The first belt support roller makes contact with the inner circumferential surface of the intermediate transfer belt so as to have the intermediate transfer belt wound around it.

The secondary transfer roller is disposed opposite the first belt support roller across the intermediate transfer belt. The secondary transfer roller is fed with a secondary transfer current to secondarily transfer the toner image transferred to the intermediate transfer belt on to a sheet passing between the secondary transfer roller and the intermediate transfer belt.

The second belt support roller is rotatably supported at a position downstream of the primary transfer roller, upstream of the first belt support roller, with respect to the rotation direction of the intermediate transfer belt. The second belt support roller makes contact with the inner circumferential surface of the intermediate transfer belt so as to have the intermediate transfer belt wound around it.

In the image forming apparatus described above, the first and second belt support rollers are each connected to the ground. The current feeder applies to the secondary transfer roller a transfer voltage with the opposite polarity to toner to thereby output a secondary transfer current. This permits the toner image to be secondarily transferred to the sheet as described above.

Here, the secondary transfer roller is provided in a part of the image forming apparatus near a sheet conveyance passage. This part of the image forming apparatus is where an openable cover is provided for maintenance such as sheet jam clearance inside the sheet conveyance passage, and is close to a side face of the apparatus body. This leaves limited space for wiring there. Moreover, because the transfer voltage is comparatively high, if it is applied at a place close to the apparatus body's side face, it is necessary to prevent electric discharge to a metal member constituting a frame part of the apparatus body. This requires an adequate creepage distance to be secured between the frame part near the side face and the secondary transfer roller. This may complicate the structure of, for example, the wiring for the output of the secondary transfer current.

To cope with that, some known image forming apparatuses are provided with a current feeder that is configured to apply to the first belt support roller a transfer voltage with the same polarity as toner to feed a transfer current to the secondary transfer roller.

In these image forming apparatuses, the first belt support roller is not connected to the ground. Moreover, in these image forming apparatuses, the secondary transfer roller and the second belt support roller may each be connected to the ground. Furthermore, space can more easily be secured around the first belt support roller than around the secondary transfer roller, and so can a creepage distance between the frame part and the first belt support roller.

SUMMARY

According to a first aspect of the present disclosure, an image forming apparatus includes an image carrying member, a intermediate transfer belt, a primary transfer roller, a first belt support roller, a secondary transfer roller, a second belt support roller, a current feeder, a controller, a current sensor, and a rectifier. The image carrying member carries a toner image on its surface. The intermediate transfer belt is endless, is disposed adjacent to the image carrying member,] and is rotatably supported. The primary transfer roller makes contact with the inner circumferential surface of the intermediate transfer belt, is disposed opposite the image carrying member across the intermediate transfer belt, and primarily transfers the toner image carried on the image carrying member to the intermediate transfer belt by applying a primary transfer voltage to the intermediate transfer belt. The first belt support roller is rotatably supported at a position downstream of the primary transfer roller with respect to the rotation direction of the intermediate transfer belt, with the intermediate transfer belt wound around the first belt support roller. The secondary transfer roller is connected to the ground, is disposed opposite the first belt support roller across the intermediate transfer belt, and secondarily transfers, with a predetermined secondary transfer current, the toner image to a sheet passing between the secondary transfer roller and the intermediate transfer belt. The second belt support roller is rotatably supported downstream of the primary transfer roller, upstream of the first belt support roller, with respect to the rotation direction of the intermediate transfer belt, and makes contact with the inner circumferential surface of the intermediate transfer belt. The current feeder is connected to the first belt support roller, and passes in the secondary transfer roller the secondary transfer current as part of an output current that passes in the first belt support roller when an output voltage of the same polarity as the toner image is applied to the first belt support roller. The controller controls the current feeder. The current sensor has a lead member electrically connecting between the current feeder and the second belt support roller, and senses a leak current passing from the first belt support roller via the intermediate transfer belt to the second belt support roller. The rectifier is electrically connected between the second belt support roller and the ground, shuts off a current passing from the second belt support roller to the ground if the voltage on the second belt support roller is less than a predetermined reference voltage, and permits the leak current to pass from the second belt support roller to the ground if the voltage on the second belt support roller is equal to or more than the reference voltage. The controller controls the output current such that the secondary transfer current has a current value resulting from subtracting the leak current from the output current, and keeps the voltage on the second belt support roller less than the reference voltage when the lead member is in a conducting state.

DETAILED DESCRIPTION

Figure 1:
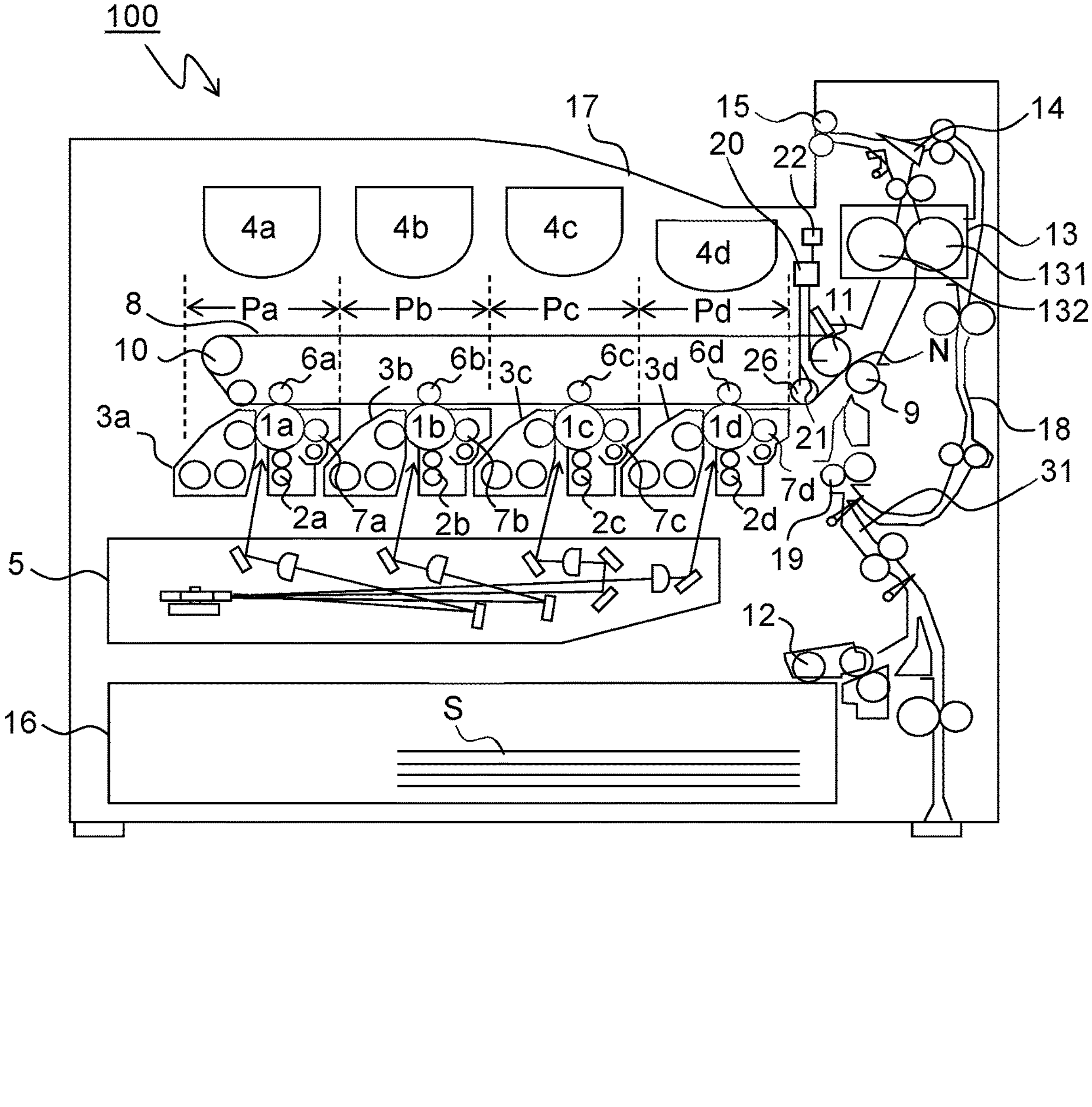
FIG. 1 is a schematic sectional view showing the internal construction of an image forming apparatus according to a first embodiment of the present disclosure.

A first embodiment of the present disclosure will be described below with reference to the accompanying drawings. FIG. 1 is a schematic sectional view showing the internal construction of an image forming apparatus 100 according to the first embodiment of the present disclosure. First, with reference to FIG. 1, the overall construction of the image forming apparatus 100 will be described.

As shown in FIG. 1, inside the body of the image forming apparatus 100 (here, a color printer), four image forming sections Pa, Pb, Pc, and Pd are disposed in this order from upstream (left in FIG. 1) along the conveyance direction. The image forming sections Pa to Pd are provided to correspond to images of four different colors (cyan, magenta, yellow, and black), and form the cyan, magenta, yellow, and black images sequentially each through the processes of electrostatic charging, exposure to light, image development, and image transfer.

In the image forming sections Pa to Pd, photosensitive drums (image carrying members) 1*a* to 1*d* are rotatably supported. The photosensitive drums 1*a* to 1*d* carry visible images (toner images) of the different colors. The photosensitive drums 1*a* to 1*d* are connected to a main motor (unillustrated). With a rotative driving force from the main motor, the photosensitive drums 1*a* to 1*d* rotate clockwise in FIG. 1.

Around and under the photosensitive drums 1*a* to 1*d*, there are provided charging devices 2*a* to 2*d*, an exposure device 5, developing devices 3*a* to 3*d*, and cleaning devices 7*a* to 7*d*.

The charging devices 2*a* to 2*d* electrostatically charge the photosensitive drums 1*a* to 1*d*. The exposure device 5 exposes the photosensitive drums 1*a* to 1*d* to light based on image data. The developing devices 3*a* to 3*d* are loaded with two-component developer containing cyan, magenta, yellow, and black toner respectively.

The developing devices 3*a* to 3*d* form toner images on the photosensitive drums 1*a* to 1*d*. The toner images here have a positive polarity. When the proportion of the toner in the two-component developer in any of the developing devices 3*a* to 3*d* falls below a prescribed value, toner is supplied to them from whichever of toner containers 4*a* to 4*d* correspond to them. The cleaning devices 7*a* to 7*d* remove the developer (toner) and the like left behind on the photosensitive drums 1*a* to 1*d*.

At a position adjacent to the image forming sections Pa to Pd, an intermediate transfer belt 8 is disposed. The intermediate transfer belt 8 is configured with a sheet of a dielectric resin (a resin material containing conductive carbon), as a belt with no seam (seamless belt). The intermediate transfer belt 8 has a surface resistivity of 9.5 log Ω/sq or more but 10.5 log Ω/sq or less.

At the inner side of the intermediate transfer belt 8, there are arranged a driven roller 10, a driving roller 11 (first belt support roller), primary transfer rollers 6*a* to 6*d*, and a belt support roller 26 (second belt support roller).

The driven roller 10 and the driving roller 11 are disposed side by side in the horizontal direction. The driven roller 10 and the driving roller 11 are rotatably supported. The driving roller 11 is connected to a belt driving motor (unillustrated), which outputs a rotative driving force.

The intermediate transfer belt 8 is wound around, so as to bridge between, the driven roller 10, upstream, and the driving roller 11, downstream. With the rotative driving force from the driving motor, the driving roller 11 rotates, and thus the intermediate transfer belt 8 rotates along the circumferential direction of the driving roller 11. As the intermediate transfer belt 8 rotates, the driven roller 10 follows it to rotate.

The intermediate transfer belt 8 makes contact with the photosensitive drums 1*a* to 1*d*. The primary transfer rollers 6*a* to 6*d* are disposed opposite the photosensitive drums 1*a* to 1*d* across the intermediate transfer belt 8. The primary transfer rollers 6*a* to 6*d* apply electric fields, with a predetermined transfer voltage, to the intermediate transfer belt 8 between the primary transfer rollers 6*a* to 6*d* and the photosensitive drums 1*a* to 1*d*.

The belt support roller 26 is disposed downstream of the primary transfer roller 6*d*, upstream of the driving roller 11, with respect to the rotation direction of the intermediate transfer belt 8. The belt support roller 26 is rotatably supported. The belt support roller 26 is kept in pressed contact with the inner circumferential surface of the intermediate transfer belt 8 so as to have the intermediate transfer belt 8 wound around it.

The driving roller 11 is disposed opposite a secondary transfer roller 9 across the intermediate transfer belt 8. The secondary transfer roller 9 and the intermediate transfer belt 8 form a secondary transfer nip between them.

In a lower part of the body of the image forming apparatus 100, a sheet cassette 16 is disposed, which stores sheets S (of a recording medium, such as sheets of copy paper and OHP sheets). In a side part of the body of the image forming apparatus 100, there are provided a sheet feed roller 12, a main conveyance passage 31, a pair of discharge rollers 15, the secondary transfer roller 9, a fixing device 13, and a pair of registration rollers 19.

The sheet feed roller 12 is disposed above the sheet cassette 16, and makes contact with the topmost sheet S in the sheet cassette 16. The main conveyance passage 31 extends from the sheet feed roller 12 to the pair of discharge rollers 15, which is provided in an upper part of the image forming apparatus 100. The main conveyance passage 31 is a passage through which sheets S are conveyed. The sheet feed roller 12 feeds the sheets S in the sheet cassette 16 one by one to the main conveyance passage 31.

The main conveyance passage 31 branches, at a position halfway along it, into a duplex conveyance passage 18. The duplex conveyance passage 18 extends downward from the junction where it branches off the main conveyance passage 31, to eventually rejoin the main conveyance passage 31. At the junction, a branch section 14 is provided. The branch section 14 distributes a sheet S being conveyed along the main conveyance passage 31 either to the pair of discharge rollers 15 or to the duplex conveyance passage 18. The pair of discharge rollers 15 discharges the sheet S distributed to it onto a discharge tray 17 formed in the top face of the image forming apparatus 100.

The secondary transfer roller 9 is located upstream of the branch section 14 of the main conveyance passage 31, downstream of the place where the duplex conveyance passage 18 rejoins the main conveyance passage 31, with respect to the sheet conveyance direction. The secondary transfer roller 9 is disposed opposite the driving roller 11 across the intermediate transfer belt 8. The secondary transfer roller 9 and the intermediate transfer belt 8 form a secondary transfer nip N between them. The secondary transfer roller 9 has a total resistance of 6.5 log Ω or more but 8.5 log Ω or less.

The secondary transfer roller 9 has a metal base 32 and a coat 33. The metal base 32 is a metal cylindrical member with a diameter of 8 to 16 mm. The coat 33 is a layer with a thickness of 3 to 6 mm that is laid on the outer circumferential surface of the metal base 32. The coat 33 is formed of a foamed resin material produced by foaming an ion-conductive resin material, or a resin material containing conductive carbon.

The pair of registration rollers 19 is located in the main conveyance passage 31, downstream of the place where the duplex conveyance passage 18 rejoins it. The pair of registration rollers 19 corrects a skew in the sheet S conveyed along the main conveyance passage 31, and transports the sheet S, with predetermined timing, to the secondary transfer nip N mentioned above.

Next, image formation on a sheet S will be described in detail. When image data is fed in from a host device such as a personal computer, first, the charging devices 2*a* to 2*d* electrostatically charge the surfaces of the photosensitive drums 1*a* to 1*d* uniformly. Next, the exposure device 5 shines light based on image data to, so as to form electrostatic latent images on, the photosensitive drums 1*a* to 1*d*. Next, the developing devices 3*a* to 3*d* feed toner onto the photosensitive drums 1*a* to 1*d* so that the toner electrostatically attaches to them and thereby forms toner images based on the electrostatic latent images mentioned above.

When the driving roller 11 is driven to rotate by the belt driving roller, as the driving roller 11 rotates, the intermediate transfer belt 8 starts to rotate counter-clockwise in FIG. 1. As the intermediate transfer belt 8 rotates, the cyan, magenta, yellow, and black toner images formed on the photosensitive drums 1*a* to 1*d* are primarily transferred, one after another, to the intermediate transfer belt 8.

The toner and the like left behind on the surfaces of the photosensitive drums 1*a* to 1*d* after primary transfer are removed by the cleaning devices 7*a* to 7*d* in preparation for the subsequent formation of new electrostatic latent images.

After that, the sheet S is conveyed from the pair of registration rollers 19, with predetermined timing, to the secondary transfer nip N. The sheet S conveyed downstream by the pair of registration rollers 19 makes contact with the intermediate transfer belt 8 upstream of the secondary transfer nip N. More specifically, the sheet S makes contact with the intermediate transfer belt 8 at a position between the driving roller 11 and the belt support roller 26 with respect to the rotation direction of the intermediate transfer belt 8. While in contact with the intermediate transfer belt 8, the sheet S is conveyed to the secondary transfer nip N.

Here, when secondary transfer takes place, the driving roller 11 is fed with a voltage from a current feeder 20 (see FIG. 2), which will be described later, and thus a secondary transfer current passes from the driving roller 11 to the secondary transfer roller 9. As a result of the sheet S, while in contact with the intermediate transfer belt 8, being conveyed to the secondary transfer nip N, the full-color image on the intermediate transfer belt 8 is secondarily transferred to the sheet S. The current feeder 20 will be described in detail later.

The sheet S having the toner images secondarily transferred to it is conveyed on to the fixing device 13. The sheet S conveyed to the fixing device 13 is heated and pressed by a fixing roller 132 and a pressing roller 131. The toner images are thus fixed to the surface of the sheet S, forming a predetermined full-color image there. The sheet S having the full-color image formed on it has its conveyance direction switched by the branch section 14, which branches into a plurality of directions, so that the sheet S is, as it is (or after being fed to the duplex conveyance passage 18 to have images formed on both sides), discharged onto the discharge tray 17 by the pair of discharge rollers 15.

Figure 2:
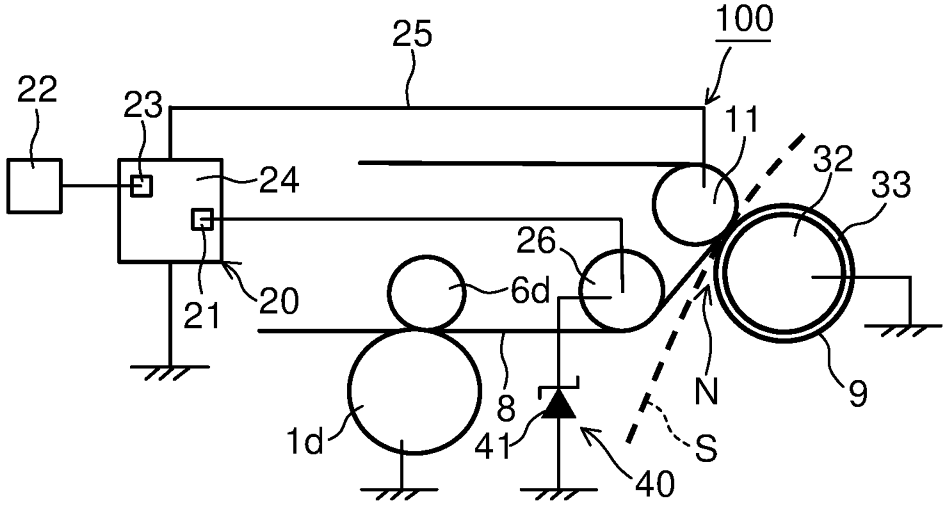
FIG. 2 is an enlarged view around an intermediate transfer belt and a current feeder.
Figure 3:
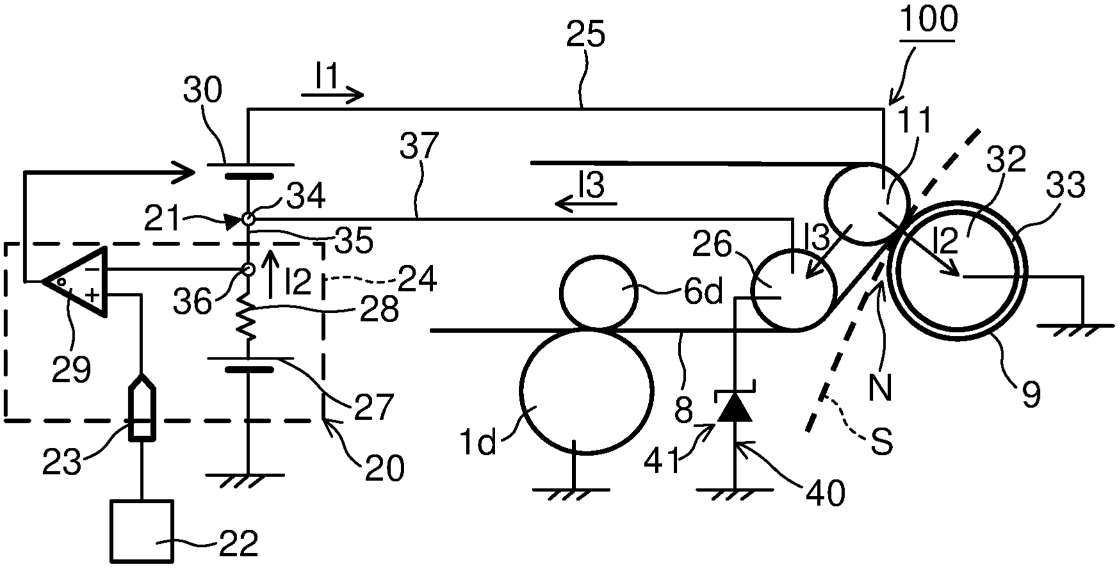
FIG. 3 is a diagram showing in detail the circuit configuration of the current feeder shown in FIG. 2.

Next, a description will be given of the construction of the part of the image forming apparatus 100 involved in secondary transfer. FIG. 2 is an enlarged view around the intermediate transfer belt 8 and the current feeder 20. FIG. 3 is a diagram showing in detail the circuit configuration of the current feeder 20 shown in FIG. 2. As shown in FIG. 2, the image forming apparatus 100 includes, in addition to the current feeder 20 and the other components mentioned above, a current sensor 21, a rectifier 40, and a controller 22.

The current feeder 20 includes a variable power supply 23, a constant-current circuit 24, and an output path 25. The variable power supply 23 outputs a variable voltage. The variable voltage is a voltage that varies according to the image data fed in. Predetermined voltage values of the variable voltage are, so that it takes values appropriate in secondary transfer, stored in the controller 22 beforehand based on varying values included in the image data. The controller 22 varies the variable voltage according to the image data fed in.

The constant-current circuit 24 is a circuit that generates an output current. To the constant-current circuit 24, the variable power supply 23 is connected. The output path 25 is an electric lead (conductor wire) connected to the driving roller 11 and to the constant-current circuit 24. The output current passes across the output path 25 into the driving roller 11. The circuit configuration of the constant-current circuit 24 will be described in detail later.

The current sensor 21 is connected to the constant-current circuit 24 and to the belt support roller 26, and senses a leak current that passes in the belt support roller 26. The controller 22 is connected to the constant-current circuit 24.

The rectifier 40 is electrically connected between the ground and the belt support roller 26. The rectifier 40 is a rectification circuit configured to shut off the current passing from the belt support roller 26 to the ground if the voltage on the belt support roller 26 is lower than a predetermined reference value, and to permit a leak current to pass from the belt support roller 26 to the ground if the voltage on the belt support roller 26 is equal to or higher than a predetermined reference voltage value (reference value).

Specifically, the rectifier 40 is a circuit configured to include a Zener diode 41 of which the cathode is connected to the belt support roller 26 and of which the anode is connected to the ground. Used as the Zener diode 41 is one of which the Zener voltage is equal to the reference voltage value mentioned above.

Based on the value of the leak current sensed by the current sensor 21, the controller 22 controls the output current. Specifically, the controller 22 outputs a voltage value that corresponds to a predetermined secondary transfer current value. Moreover, when the current sensor 21 is in a conducting state (more specifically, when a sensing path 37, described later, is in a conducting state), the controller 22 keeps the voltage on the belt support roller 26 below the reference voltage value mentioned above. The reference voltage value is 50 V more but 200 V or less.

Next, with reference to FIG. 3, the configuration of the constant-current circuit 24 will be described. The constant-current circuit 24 includes a low-voltage power supply 27 (constant-voltage power supply), a resistor 28, an operational amplifier 29, and a high-voltage power supply 30. The low-voltage power supply 27 is connected, with the resistor 28 in between, to the negative terminal (second terminal) of the operational amplifier 29 (constant-voltage power supply).

To the positive terminal (first terminal) of the operational amplifier 29, the variable power supply 23 is connected. The output terminal of the operational amplifier 29 is connected to the high-voltage power supply 30. The operational amplifier 29 adjusts the output of the high-voltage power supply 30 such that the difference between the voltage values at the positive and negative terminals equals zero, that is, such that the voltage values at the positive and negative terminals are equal.

One terminal of the output path 25 is connected to the driving roller 11, and the other terminal of the output path 25 is connected to the high-voltage power supply 30.

The current sensor 21 includes the operational amplifier 29 mentioned above and the sensing path 37 (lead member). One terminal of the sensing path 37 is connected to the belt support roller 26, and the other terminal (hereinafter referred to as the sense terminal 34) of the sensing path 37 is connected to a wiring path 35 connecting between the high-voltage power supply 30 and the resistor 28.

The high-voltage power supply 30 outputs a voltage of 300 V or more but 7000 V or less. The output voltage of the low-voltage power supply 27 is lower than the output voltage of the high-voltage power supply 30.

When image data is fed in from a host device such as a personal computer, first, the controller 22 derives a secondary transfer current I2 and a variable voltage that are adequate based on the image data. Next, the high-voltage power supply 30 and the low-voltage power supply 27 output voltages respectively, and the variable power supply 23 outputs the variable voltage.

Here, let the output voltage of the variable power supply 23 be Vcont [V], let the output voltage of the low-voltage power supply 27 be Vref [V], and let the resistance value of the resistor 28 be R [Ω]. Then the current I2 through the resistor 28 is given by Equation (1) below.

$$I2=(\mathrm{Vref}-\mathrm{Vcont})/R \quad (1)$$

Here, the current that passes from a terminal 36 to the operational amplifier 29 is very low. Accordingly, the current that passes from the terminal 36 (the terminal of the resistor 28 leading to the operational amplifier 29) has a current value approximately equal to I2. The current that passes across the terminal 36 at this time is equal to the secondary transfer current.

When the variable voltage is output, an output current I1 passes across the output path 25 into the driving roller 11. Part of the output current I1 passes from the driving roller 11 into, as the secondary transfer current I2, the secondary transfer roller 9. At the same time, the rest of the output current I1 passes from the driving roller 11 into, as a leak current I3, the belt support roller 26. The leak current I3 passes across the sensing path 37 into the sense terminal 34.

If any variation occurs in the electrical load such as the secondary transfer roller, the intermediate transfer belt 8, and the sheet S, the current feeder 20 keeps the current I2 constant with the operational amplifier 29 adjusting the output voltage of the high-voltage power supply 30.

Here, as described above, the current across the terminal 36 is controlled to be equal to the secondary transfer current I2. Thus the current value of the current across the sense terminal 34 is equal to the sum of the current value of the secondary transfer current I2 and the current value of the leak current I3. In other words, the output current I1 has a value that is the sum of the secondary transfer current I2 and the leak current I3. Even if the current value of the leak current I3 varies, the current feeder 20 controls the high-voltage power supply 30 and thereby controls the value of the output current I1, and this permits the current value of the secondary transfer current I2 to be kept constant.

On the other hand, when the sensing path 37 is in the conducting state, the voltage on the belt support roller 26 is controlled to be less than the reference voltage value mentioned above (i.e., the value of the Zener voltage of the Zener diode 41). Thus the rectifier 40 shuts off the current that passes from the belt support roller 26 to the ground. Hence the leak current across the belt support roller 26 passes to the sensing path 37.

In case of breakage of the sensing path 37, the voltage on the belt support roller 26 rises. If the voltage on the belt support roller 26 becomes higher than the reference voltage value mentioned above, a Zener current passes across the rectifier 40, and at least part of the leak current passes from the belt support roller 26 to the ground.

Next, a detailed description will be given of an example of the connection of the current feeder 20 with the driving roller 11, the connection of the current sensor 21 with the belt support roller 26, and the connection of the rectifier 40 with the belt support roller 26.

Figure 4:
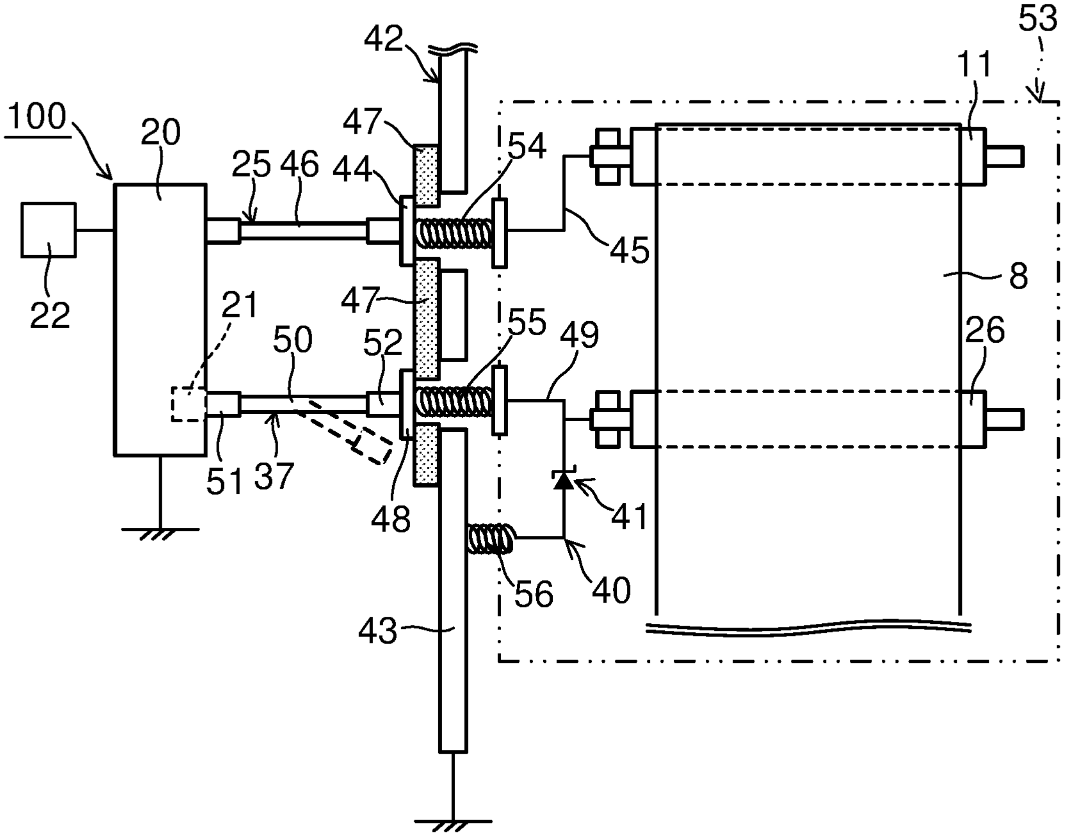
FIG. 4 is a schematic diagram showing an example of electrical connection of the current feeder with components around an intermediate transfer unit.

FIG. 4 is a schematic diagram showing an example of electrical connection of the current feeder 20 with components around an intermediate transfer unit 53. As shown in FIG. 4, the image forming apparatus 100 includes, in addition to those already mentioned, a frame member 43. The frame member 43 constitutes part of the body 42 of the image forming apparatus 100 (hereinafter referred to as the apparatus body 42). The frame member 43 is formed of a sheet metal material that is an electrically conductive material. The frame member 43 is connected to the ground.

The output path 25 includes a first coupling terminal 44, a first linking lead 45, a first contact spring 54, and an output lead 46.

The first coupling terminal 44 is fastened to the frame member 43 via an insulating fastening member 47. The insulating fastening member 47 insulates between the first coupling terminal 44 and the frame member 43. The first linking lead 45 is electrically connected to the driving roller 11. The first contact spring 54 is a spring formed of an electrically conductive material. The first contact spring 54 is electrically connected between the first coupling terminal 44 and the first linking lead 45.

One terminal of the output lead 46 is connected to the current feeder 20. The other terminal of the output lead 46 is removably connected to the first coupling terminal 44 from the side opposite from the first linking lead 45 across the frame member 43.

The sensing path 37 includes a second coupling terminal 48 (coupling terminal), a second linking lead 49 (first lead), a second contact spring 55, and a sensing lead 50 (second lead).

The second coupling terminal 48 is fastened to the frame member 43 via the insulating fastening member 47. The insulating fastening member 47 insulates between the second coupling terminal 48 and the frame member 43. The second linking lead 49 is electrically connected to the belt support roller 26. The second contact spring 55 is a spring formed of an electrically conductive material. The second contact spring 55 is electrically connected between the second coupling terminal 48 and the second linking lead 49.

The sensing lead 50 includes a first sensing terminal 51 (third terminal) and a second sensing terminal 52 (fourth terminal). The first sensing terminal 51 is connected to the current feeder 20 via the current sensor 21. The second sensing terminal 52 is removably connected to the second coupling terminal 48 from the side opposite from the second linking lead 49 across the frame member 43.

The rectifier 40 includes a third contact spring 56 and the Zener diode 41. The third contact spring 56 is a spring formed of an electrically conductive material. The third contact spring 56 is electrically connected to the frame member 43.

The Zener diode 41 is, at its cathode, connected to the belt support roller 26 and, at its anode, connected via the third contact spring 56 to the frame member 43. The Zener diode 41 is connected to the belt support roller 26 and the frame member 43 at a position opposite from the second sensing terminal 52 across the second coupling terminal 48.

The intermediate transfer belt 8, the driven roller 10 (see FIG. 1), the driving roller 11, the first linking lead 45, the second linking lead 49, and the rectifier 40 described above constitute an intermediate transfer unit 53. An openable cover (unillustrated) is provided in a side face of the apparatus body 42 of the image forming apparatus 100, and with this cover open, the intermediate transfer unit 53 can be mounted in the apparatus body 42.

With the intermediate transfer unit 53 mounted in the apparatus body 42, the first contact spring 54 makes contact with the first linking lead 45, so that the first coupling terminal 44 and the driving roller 11 are electrically connected together.

Similarly, with the intermediate transfer unit 53 mounted in the apparatus body 42, the second contact spring 55 makes contact with the second linking lead 49, so that the second coupling terminal 48 and the belt support roller 26 are electrically connected together. Moreover, in this state, the third contact spring 56 in the rectifier 40 makes contact with the frame member 43, so that the belt support roller 26 is connected via the Zener diode 41 to the ground.

In the image forming apparatus 100 according to the embodiment described above, the current feeder 20 controls the output current such that the current value resulting from subtracting the leak current from the output current is equal to the secondary transfer current set by the controller 22. Thus, even if a leak current occurs, by increasing the current value of the output current to an extent corresponding to the leak current, it is possible to suppress a drop in the secondary transfer current.

It is thus possible to provide an image forming apparatus 100 that can suppress a drop in the secondary transfer current.

Consider, incidentally, an image forming apparatus 100 in which the belt support roller 26 is not connected to the ground. If the sensing path 37 breaks and in addition, for example as a result of the secondary transfer roller 9 moving away from the intermediate transfer belt 8, the path for the output current breaks off, ending at the belt support roller 26, the output voltage of the high-voltage power supply 30 at its maximum output is applied to the belt support roller 26. This may cause a leak current to pass from the belt support roller 26 to components around it. By contrast, in the image forming apparatus 100 according to the embodiment described above, if the sensing path 37 breaks or otherwise the voltage on the belt support roller 26 becomes equal to or higher than the reference voltage value then, as at least part of a leak current, a Zener current passes from the belt support roller 26 to the ground. This suppresses a rise in the voltage value on the belt support roller 26, and suppresses passage of a leak current to components around the belt support roller 26.

Breakage of the sensing path 37 may result when a maintenance engineer engaged in the work of assembly or maintenance of the image forming apparatus 100 forgets to connect the second sensing terminal 52 to the second coupling terminal 48 (as indicated by broken lines in FIG. 4). By contrast, in the image forming apparatus 100 according to the embodiment described above, the Zener diode 41 is connected to the belt support roller 26 and the frame member 43 at a position opposite from the second sensing terminal 52 across the second coupling terminal 48. Thus, even if an engineer forgets to connect the second sensing terminal 52 to the second coupling terminal 48, the belt support roller 26 stays connected to the ground via the Zener diode 41. It is thus possible to more reliably suppress passage of a leak current from the belt support roller 26 to components around it.

Moreover, as described above, the intermediate transfer belt 8 has a surface resistivity of 9.5 log Ω/sq or more but 10.5 log Ω/sq or less. With this configuration, the secondary transfer current can be given a more appropriate application bias, and it is thus possible to suppress image defects such as partial image loss resulting from electric discharge and transfer failure resulting from an insufficient transfer current.

Moreover, as described above, the secondary transfer roller 9 has a total resistance of 6.5 log Ω/sq or more but 8.5 log Ω/sq or less. With this configuration, the secondary transfer current can be given a more appropriate application bias, and it is thus possible to effectively suppress image defects resulting from electric discharge and an insufficient transfer current as mentioned above.

Moreover, as described above, the intermediate transfer belt 8 is formed of a dielectric resin (a resin material containing conductive carbon). Furthermore, the coat 33 is formed of a foamed resin material produced by foaming an ion-conductive resin material, or a resin material containing conductive carbon. With this configuration, the secondary transfer current can be given a more appropriate application bias, and it is thus possible to effectively suppress image defects resulting from electric discharge and an insufficient transfer current as mentioned above.

While in the embodiment described above the toner images are assumed to have a positive polarity, a configuration is also possible where they have a negative polarity. In that case, the Zener diode 41 is, at its anode, connected to the belt support roller 26 and, at its cathode, connected to the ground.

The present disclosure finds applications in image forming apparatuses that include between a primary transfer roller and a driving roller a belt support roller around which an intermediate transfer belt is wound and that employ a method of intermediate transfer in which secondary transfer is achieved by applying to the driving roller a bias of the same polarity as a toner image transferred to the intermediate transfer belt. According to the present disclosure, even if a leak current passes in the belt support roller, a substantially constant secondary transfer current can be passed in a secondary transfer roller disposed opposite the driving roller, and it is thus possible to suppress image defects.

What is claimed is:

1. An image forming apparatus, comprising:
- an image carrying member that carries a toner image on a surface thereof;
- an intermediate transfer belt that is disposed adjacent to the image carrying member and that is rotatably supported, the intermediate transfer belt being endless;
- a primary transfer roller that makes contact with an inner circumferential surface of the intermediate transfer belt and that is disposed opposite the image carrying member across the intermediate transfer belt, the primary transfer roller primarily transferring the toner image carried on the image carrying member to the intermediate transfer belt by applying a primary transfer voltage to the intermediate transfer belt;
- a first belt support roller that is rotatably supported at a position downstream of the primary transfer roller with respect to a rotation direction of the intermediate transfer belt and around which the intermediate transfer belt is wound;
- a secondary transfer roller that is connected to a ground and that is disposed opposite the first belt support roller across the intermediate transfer belt, the secondary transfer roller secondarily transferring, with a predetermined secondary transfer current, the toner image to a sheet passing between the secondary transfer roller and the intermediate transfer belt;
- a second belt support roller that is rotatably supported downstream of the primary transfer roller, upstream of the first belt support roller, with respect to the rotation direction of the intermediate transfer belt, the second belt support roller making contact with the inner circumferential surface of the intermediate transfer belt;
- a current feeder that is connected to the first belt support roller, the current feeder passing in the secondary transfer roller the secondary transfer current as part of an output current that passes in the first belt support roller when an output voltage of a same polarity as the toner image is applied to the first belt support roller;
- a controller that controls the current feeder;
- a current sensor that has a lead member electrically connecting between the current feeder and the second belt support roller, the current sensor sensing a leak current passing from the first belt support roller via the intermediate transfer belt to the second belt support roller;
- a rectifier that is electrically connected between the second belt support roller and the ground, the rectifier shutting off a current passing from the second belt support roller to the ground if a voltage on the second belt support roller is less than a predetermined reference voltage, the rectifier permitting the leak current to pass from the second belt support roller to the ground if the voltage on the second belt support roller is equal to or more than the reference voltage, wherein the controller
- controls the output current such that the secondary transfer current has a current value resulting from subtracting the leak current from the output current and
- keeps the voltage on the second belt support roller less than the reference voltage when the lead member is in a conducting state.

2. The image forming apparatus according to claim 1, wherein
- the current feeder includes:
  - a variable power supply that outputs a variable voltage varying according to a value of the secondary transfer current;
  - a constant-voltage power supply that outputs a predetermined constant voltage;
  - an operational amplifier having:
    - a first terminal connected to the variable power supply;
    - a second terminal connected to the constant-voltage power supply; and
    - an output terminal connected to the first belt support roller,
  - the operational amplifier amplifying the output voltage such that a constant current depending on a difference between the variable voltage and the constant voltage passes in the first belt support roller,
- the lead member is connected between the second belt support roller and the second terminal,
- the rectifier is a Zener diode of which
  - a cathode is connected to the second belt support roller and an anode is connected to the ground if the toner image has a positive polarity and
  - the anode is connected to the second belt support roller and the cathode is connected to the ground if the toner image has a positive polarity, and
- the voltage on the second belt support roller is equal to a potential difference between the second terminal and the constant voltage.

3. The image forming apparatus according to claim 1, further comprising:
- an apparatus body in which the first and second belt support rollers are supported;
- a frame member that constitutes part of the apparatus body, the frame member being formed of an electrically conductive material and being connected to the ground,
- wherein
- the lead member includes:
  - a first lead that is electrically connected to the second belt support roller;
  - a coupling terminal that is electrically connected to the first lead and that is fastened to the frame member in a state insulated therefrom;
  - a second lead having:
    - a third terminal connected to the current feeder; and
    - a fourth terminal removably connected to the coupling terminal from a side opposite from the first lead across the frame member;
- with the fourth terminal connected to the coupling terminal, the lead member is in the conducting state, and
- the rectifier is electrically connected between the first lead and the frame member.

4. The image forming apparatus according to claim 3, wherein
- the rectifier is electrically connected to the second belt support roller and the frame member at a position opposite from the fourth terminal across the coupling terminal.

5. The image forming apparatus according to claim 1, wherein the intermediate transfer belt has a surface resistivity of 9.5 log Ω/sq or more but 10.5 log Ω/sq or less, and the secondary transfer roller has a total resistance of 6.5 log Ω or more but 8.5 log Ω or less.

6. The image forming apparatus according to claim 5, wherein the intermediate transfer belt is formed of a resin material containing conductive carbon.

7. The image forming apparatus according to claim 6, wherein the secondary transfer roller includes:

a metal base that is a metal cylindrical member; and a coat laid on an outer circumferential surface of the metal base, and the coat is formed of a foamed resin material produced by foaming an ion-conductive resin material, or a resin material containing conductive carbon.

* * * * *